(12) United States Patent
Smith et al.

(10) Patent No.: US 11,050,632 B2
(45) Date of Patent: *Jun. 29, 2021

(54) AUTOMATED INVENTORY FOR IOT DEVICES

(71) Applicant: ServiceNow, Inc., Santa Clara, CA (US)

(72) Inventors: William Jason Smith, Stockholm (SE); Gianpaolo Pagano Mariano, Nacka (SE)

(73) Assignee: ServiceNow, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/581,082

(22) Filed: Sep. 24, 2019

(65) Prior Publication Data

US 2020/0092173 A1    Mar. 19, 2020

Related U.S. Application Data

(63) Continuation of application No. 15/587,279, filed on May 4, 2017, now Pat. No. 10,454,774.

(51) Int. Cl.
*H04L 12/24* (2006.01)
*H04L 29/08* (2006.01)
*G06F 15/173* (2006.01)

(52) U.S. Cl.
CPC ............. *H04L 41/12* (2013.01); *H04L 41/22* (2013.01); *H04L 67/12* (2013.01); *H04L 67/16* (2013.01); *H04L 67/24* (2013.01); *H04L 67/303* (2013.01); *H04L 41/5058* (2013.01)

(58) Field of Classification Search
CPC ..... H04L 67/10; H04L 41/145; H04L 65/403; G06F 17/30914; G06F 21/577; G06F 17/30241
USPC ................. 709/223, 224, 202, 226
See application file for complete search history.

(56) References Cited

U.S. PATENT DOCUMENTS

| | | |
|---|---|---|
| 5,978,594 A | 11/1999 | Bonnell |
| 6,321,229 B1 | 11/2001 | Goldman |
| 6,816,898 B1 | 11/2004 | Scarpelli |
| 6,895,586 B1 | 5/2005 | Brasher |
| 7,027,411 B1 | 4/2006 | Pulsipher |
| 7,392,300 B2 | 6/2008 | Anantharangachar |
| 7,617,073 B2 | 11/2009 | Trinon |
| 7,685,167 B2 | 3/2010 | Mueller |
| 7,877,783 B1 | 1/2011 | Cline |
| 7,933,927 B2 | 4/2011 | Dee |

(Continued)

FOREIGN PATENT DOCUMENTS

WO    2016154321 A1    9/2016

*Primary Examiner* — Lan Dai T Truong
(74) *Attorney, Agent, or Firm* — Fletcher Yoder PC (57) ABSTRACT

Improving automated discovery of inventory, includes obtaining a discovery message from a network device, wherein the discovery message identifies an identifier, a location, and one or more capabilities of the network device, wherein the discovery message is detected by a management instrumentation discovery (MID) server, automatically modifying a data structure of an inventory data store to include the identifier, the location, and the one or more capabilities based on the discovery message, wherein the inventory data store identifies enterprise assets and configurations of the enterprise assets, and providing the modified data structure of the inventory data store to a controller such that the network device is usable by the controller.

20 Claims, 7 Drawing Sheets

(56) References Cited

U.S. PATENT DOCUMENTS

| | | |
|---|---|---|
| 7,941,506 B2 | 5/2011 | Bonal |
| 7,945,860 B2 | 5/2011 | Vambenepe |
| 8,082,222 B2 | 12/2011 | Rangarajan |
| 8,346,752 B2 | 1/2013 | Sirota |
| 8,380,645 B2 | 2/2013 | Kowalski |
| 8,554,750 B2 | 10/2013 | Rangaranjan |
| 8,646,093 B2 | 2/2014 | Myers |
| 8,683,032 B2 | 3/2014 | Spinelli |
| 8,745,040 B2 | 6/2014 | Kowalski |
| 8,812,539 B2 | 8/2014 | Milousheff |
| 8,818,994 B2 | 8/2014 | Kowalski |
| 8,907,988 B2 | 12/2014 | Poston |
| 9,015,188 B2 | 4/2015 | Behne |
| 9,037,536 B2 | 5/2015 | Vos |
| 9,137,115 B2 | 9/2015 | Mayfield |
| 9,261,372 B2 | 2/2016 | Cline |
| 9,323,801 B2 | 4/2016 | Morozov |
| 9,412,084 B2 | 9/2016 | Kowalski |
| 9,467,344 B2 | 10/2016 | Gere |
| 9,534,903 B2 | 1/2017 | Cline |
| 9,613,070 B2 | 4/2017 | Kumar |
| 9,631,934 B2 | 4/2017 | Cline |
| 9,659,051 B2 | 5/2017 | Hutchins |
| 9,792,387 B2 | 10/2017 | George |
| 9,852,165 B2 | 12/2017 | Morozov |
| 9,967,162 B2 | 5/2018 | Spinelli |
| 10,002,203 B2 | 6/2018 | George |
| 2003/0204480 A1 | 10/2003 | Heinrichs et al. |
| 2007/0239569 A1 | 10/2007 | Lucas et al. |
| 2010/0023415 A1 | 1/2010 | Brower et al. |
| 2016/0241994 A1 | 8/2016 | Iguchi et al. |
| 2018/0335823 A1 | 11/2018 | Huang |

AUTOMATED INVENTORY FOR IOT DEVICES

CROSS-REFERENCE TO RELATED APPLICATION(S)

This is a continuation application of U.S. application Ser. No. 15/587,279, filed May 4, 2017, the entire contents of which are hereby incorporated by reference in its entirety.

TECHNICAL FIELD

Embodiments described herein generally relate to network computing and in particular for managing inventory of network devices and deployment thereof.

BACKGROUND ART

Today's technology allows computer networks any number of computer devices. Such devices may include, for example, personal computers, laptops, television devices, cell phones, tablets, smart watches, and other devices. In addition, the rise of Internet of Things (IoT) devices allows for the connection of a number of devices not typically considered computing devices, such as medical devices, children's toys, home appliances, wearable devices, turbines, and any number of other items that may contain some kind of data activity.

One of the benefits of IoT devices is that they are easily deployable. Many IoT devices may be inserted into a preexisting system. The functionality of a particular IoT device may compliment devices already existing in the network. Within the context of automating enterprise, IT, and/or other organization-related functions (e.g., human resources (HR)), platform as a service (PaaS) often provide users an array of tools to implement complex behaviors, such as enterprise rules, scheduled jobs, events, and scripts, to build automated processes and to integrate with third party systems. The rise of IoT devices has brought new challenges to managing inventory of network devices in an enterprise environment. As such, continually improving the technology of detecting and managing network devices in an enterprise environment is needed.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, a method for improving automated discovery of inventory is described. The method includes obtaining a discovery message from a network device, wherein the discovery message identifies an identifier, a location, and one or more capabilities of the network device, wherein the discovery message is detected by a management instrumentation discovery (MID) server, automatically modifying a data structure of an inventory data store to include the identifier, the location, and the one or more capabilities based on the discovery message, wherein the inventory data store identifies enterprise assets and configurations of the enterprise assets, and providing the modified data structure of the inventory data store to a controller such that the network device is usable by the controller.

In another embodiment, the method may be embodied in computer executable program code and stored in a non-transitory storage device. In yet another embodiment, the method may be implemented in a network system.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used here, the term "computing device" may refer to a device that includes, but is not limited to a single computer, host, server, laptop, and/or mobile device.

As used herein, the term "network device" may refer to any device that is capable of communicating and transmitting data to another device across any type of network. In one or more embodiments, the network device may be a device that comprises one or more sensors and may capture and transfers sensor data across a network.

As used herein, the term "computing system" may refer to a single electronic computing device or network device that includes, but is not limited to a single computer, virtual machine, virtual container, host, server, laptop, and/or mobile device. The term "computing system may also refer to a plurality of electronic computing devices and/or network devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

Various example embodiments are disclosed herein that provide techniques for managing enterprise inventory. Specifically, one or more embodiments are directed to obtaining a discovery message from a network device, such as an Internet of Things (IoT) device. The discovery message may include information such as identification information for the device, capabilities of the device, and location information for the device. The discovery message may be received by a management instrumentation discovery (MID) server. A data structure utilized to manage enterprise inventory may be modified based on the discovery message to include the network device. The data structure may be modified to include a new sub-structure for the network device, and may be modified to include relationships between the network device and other devices captured in the inventory in the data structure. The modified data structure may then be provided to a controller, such as a person or device, such that the capabilities of the network device may be available to the controller.

In addition, in one or more embodiments, the capabilities of the network device may be tied to an operation of a workflow. As an example sensor data received from the network device may be analyzed to determine whether an operation of a workflow should be triggered. In one or more embodiments, a graphical user interface may be provided that depicts visual information related to the location information for the device. According to one or more embodiments, the controller may subscribe to the device, such that alerts are received when the location information for the network device changes. A graphical user interface may depict that change, for example in the form of a map or graph. In one or more embodiments, a user may control or utilize the capabilities of the network device through the user interface.

Figure 1:
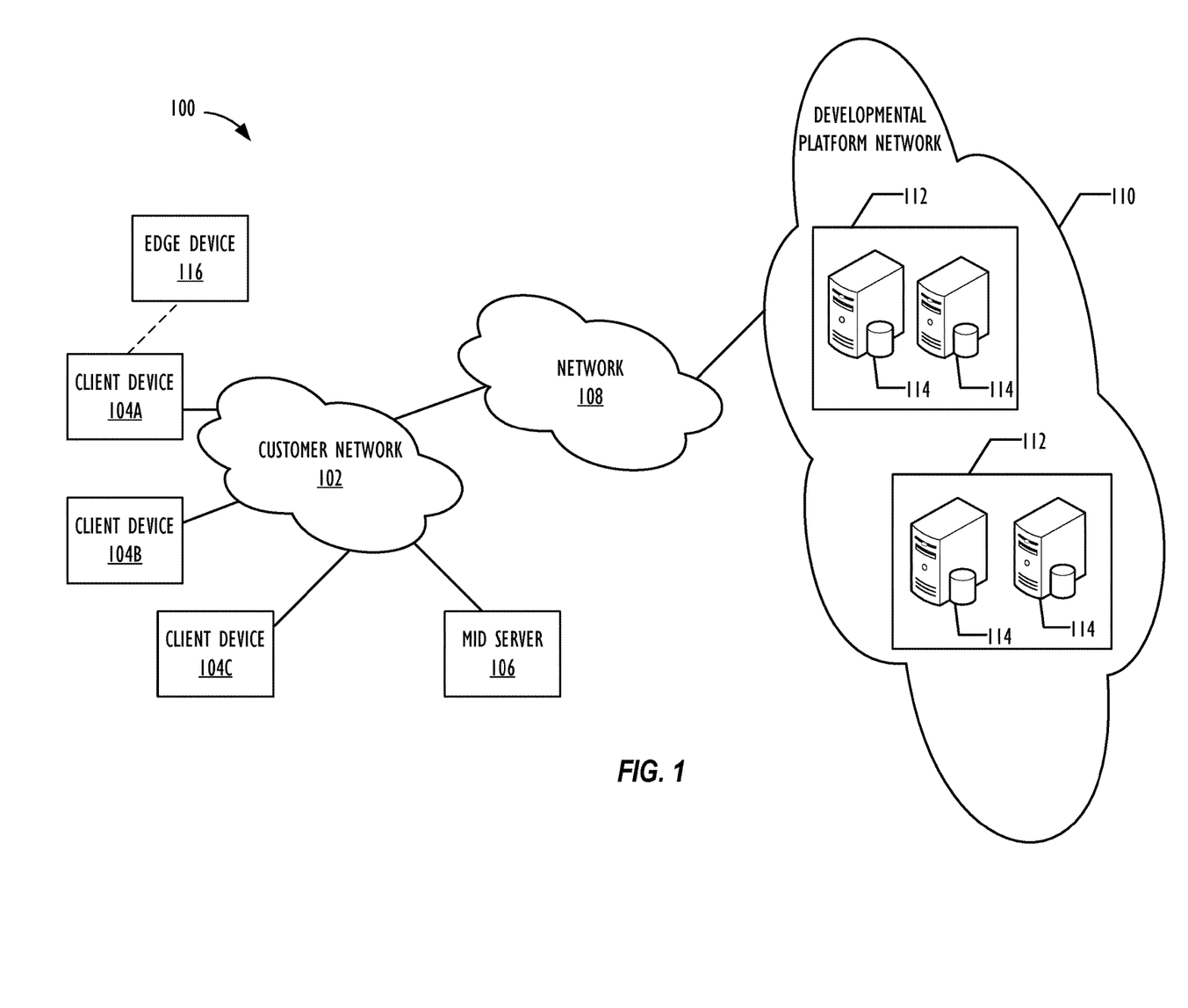
FIG. 1 is a schematic diagram of an embodiment of a network computing system where embodiments of the present disclosure may operate herein.

FIG. 1 is a schematic diagram of an embodiment of a computing system 100, such as a cloud computing system, where embodiments of the present disclosure may operate herein. Computing system 100 may include a customer network 102, network 108, and developmental platform network 110. In one embodiment, the customer network 102 may be a local private network, such as local area network (LAN) that includes a variety of network devices that include, but are not limited to switches, servers, and routers. In another embodiment, the customer network 102 represents an enterprise network that could include one or more local area networks (LANs), virtual networks, data centers 112 and/or other remote networks. As shown in FIG. 1, the customer network 102 is able to connect to one or more client devices 104A-C so that the client devices are able to communicate with each other and/or with the developmental platform network 110. The client devices 104A-C may be computing systems and/or other types of computing devices generally referred to as Internet of Things that access cloud computing services, for example, via a web browser application or via an edge device 116 that may act as a gateway between the client device and the remote device. FIG. 1 also illustrates that the customer network 102 includes a management, instrumentation, and discovery (MID) servers 106 that facilitate communication of data between the developmental platform network 110, other external applications, data sources, and services, and the customer network 102. Although not specifically illustrated in FIG. 1, the customer network 102 may also include a connecting network device (e.g., gateway or router) or a combination of devices that implement a customer firewall or intrusion protection system.

FIG. 1 illustrates that customer network 102 is coupled to a network 108. The network 108 may include one or more computing networks available today, such as other LANs, wide area networks (WAN), the Internet, and/or other remote networks, in order to transfer data between the client devices 104A-C and the developmental platform network 110. Each of the computing networks within network 108 may contain wired and/or wireless programmable devices that operate in the electrical and/or optical domain. For example, network 108 may include wireless networks, such as cellular networks (e.g., Global System for Mobile Communications (GSM) based cellular network) wireless fidelity (Wi-Fi®) networks, and/or other suitable radio based network as would be appreciated by one of ordinary skill in the art upon viewing this disclosure. The network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, the developmental platform network 110 may be a remote network (e.g., a cloud network) that is able to communicate with the client devices 104A-C via the customer network 102 and network 108. The developmental platform network 110 acts as a platform that provides additional computing resources to the client devices 104A-C and/or customer network 102. For example, by utilizing the developmental platform network 110, users of client devices 104A-C are able to build and execute applications, such as automated processes for various enterprise, IT, and/or other organization-related functions. In one embodiment, the developmental platform network 110 includes one or more data centers 112, where each data center 112 could correspond to a different geographic location. Within the data center 112 include a plurality of server instances 114. Each server instance 114 can be implemented on a physical computing system, such as a single electronic computing device (e.g., a single physical hardware server) or could be in the form a multi-computing device (e.g., multiple physical hardware servers). Examples of server instances 114 include, but are not limited to a web server instance (e.g., a unitary Apache installation), an application server instance (e.g., unitary Java Virtual Machine), and/or a database server instance (e.g., a unitary MySQL catalog).

To utilize computing resources within the developmental platform network 110, network operators may choose to configure the data centers 112 using a variety of computing infrastructures. In one embodiment, one or more of the data centers 112 are configured using a multi-tenant cloud architecture such that a single server instance 114, which can also be referred to as an application instance, handles requests and serves multiple customers. In other words, data centers with multi-tenant cloud architecture commingle and store data from multiple customers, where multiple customer instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. Generally, implementing a multi-tenant cloud architecture suffer drawbacks, such as a failure to single server instance 114 causing outages for all customers allocated to the single server instance 114.

In another embodiment, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access the developmental platform network 110, and customer-driven upgrade schedules.

Figure 2:
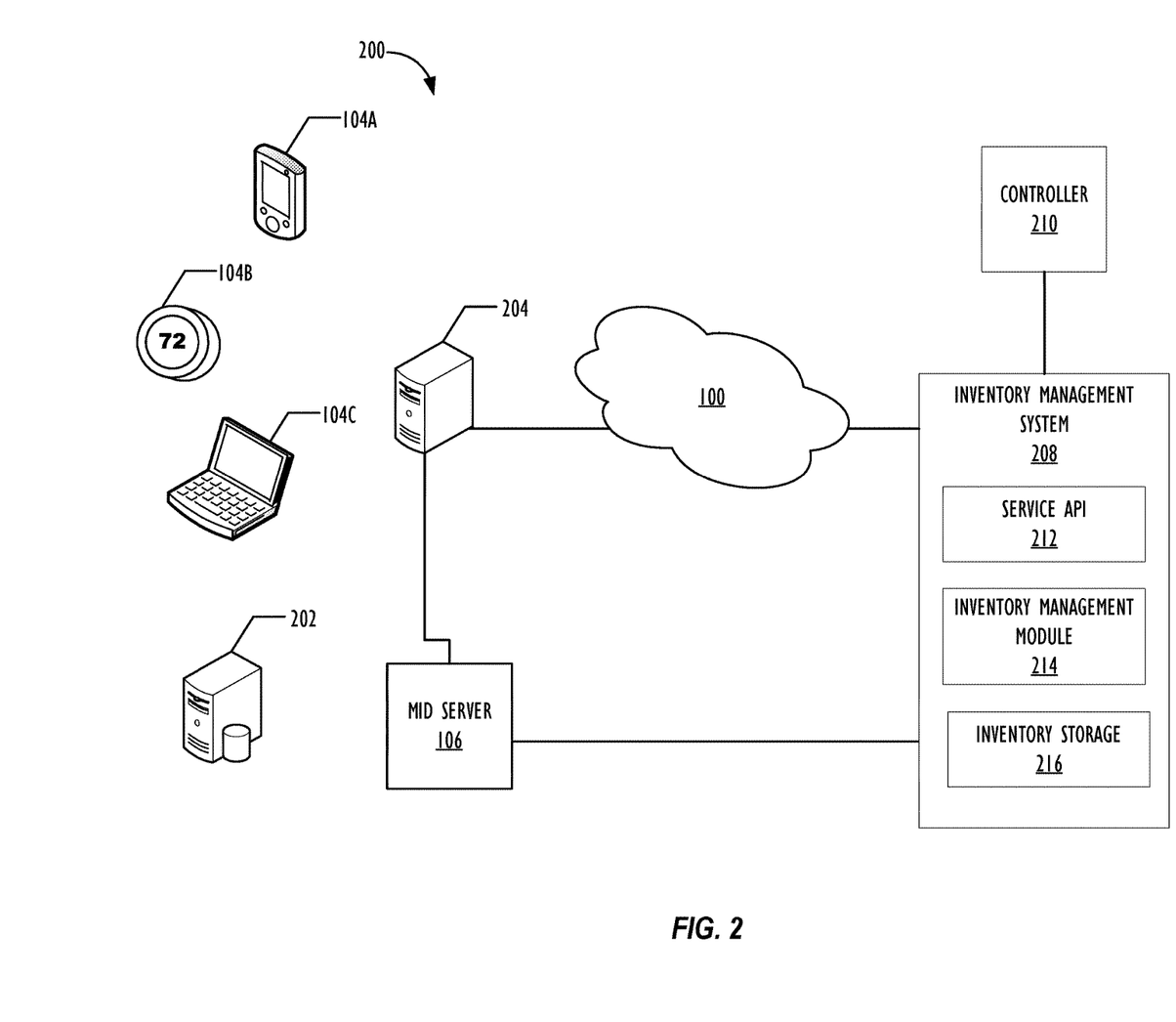
FIG. 2 is a schematic diagram of an embodiment of a network architecture where embodiments of the present disclosure may operate herein.

FIG. 2 illustrates a more specific network implementation for the use of a system of actions for network devices. Network architecture 200 includes many of the components depicted in FIG. 1. For purposes of example, the various client devices 104 may include different types of network devices, such as tablet devices, laptop computers, and any kind of device that produces data, such as the thermostat shown, often referred to as Internet of Things (IoT) devices. According to one or more embodiments, the various network devices 104 may be discovered, managed, and/or monitored by MID server 106. According to one or more embodiments, the MID server 106 may discover advertising messages from network device, which may include identifying information about the device. In one or more embodiments, the advertising message may include additional information about the device, such as configuration information, capabilities of the device, location information about the device, and the like.

Alternatively, or additionally, the MID server 106 may identify that a network device has been added to the network 100, for example based on an advertising message, and may utilize discovery probes to probe the device for more information. In one or more embodiments, the MID server 106 may be installed on a local internal network for a particular network 100. The MID server 106 may probe identified devices for additional classification and identification information, such as capabilities of the network device, or location information for the network device. According to one or more embodiments, the newly discovered device may not initially be able to "subscribe" to the MID server 106 or otherwise transmit data such as capabilities and the like. Beyond discovering that new devices have appeared on the network, the probes may discover entirely new devices types that were not known about before the device was probed. According to one or more embodiments, machine learning algorithms may be used to discover device types that were unknown at the design time of the probes themselves, and may also discover device type capabilities that were unknown at the design time of the probes themselves. Once the new device types and associated capabilities are discovered, they can optionally be automatically put to use, as described below.

In one or more embodiments, the client-side devices may include additional components, such as a database server 202, which may store data, such as data generated by the client devices 104. In one or more embodiments, client devices 104 may include network devices, such as IoT devices, which may include sensors and other components utilized to capture and generate data. The data may be stored in database server 202, or among other storage devices across the network 100. As depicted in architecture 200, the network system may also include one or more broker gateways 204 that may communicate with the various network devices using various protocols. For example, broker gateway 204 may communicate with the client devices 104 using Message Queue Telemetry Transport (MQTT), Wifi® (WIFI is a registered trademark of Wi-Fi Alliance), Bluetooth® (BLUETOOTH is a registered trademark of Bluetooth Special Interest Group), and Near Field Communication (NFC).

As depicted, another component in the network architecture according to one or more embodiments is an inventory management system 208. According to one or more embodiments, the inventory management system may be comprised in another component, such as within developmental platform network 110. According to one or more embodiments. As an example, inventory management system 208 may be encompassed within a developmental platform server instance 114. In one or more embodiments, inventory management system 208 may be comprised in a single device, or may be distributed among multiple devices. Inventory management system 208 may include several components, such as service API 212, inventory management module 214, and inventory storage 216. In one or more embodiments, service API 212 and inventory management module 214 may include computer readable code or instructions that are executable by one or more processors to perform certain operations. According to one or more embodiments, service API 212 may provide an interface between a controller 210 and the network devices 104. The controller 210 may be a device or entity that interfaces with the inventory management system 208 to utilize the inventory of system 200.

Service API 212 may also provide an interface for the controller to utilize the enterprise inventory to perform operations within workflows.

Inventory management module 214 may manage inventory across a system. In one or more embodiments, inventory management module 214 may maintain a data structure indicating the inventory in inventory storage 216. Inventory storage 216 may be a computer readable storage device. The data structure may be any kind of data structure, such as a database. In one or more embodiments, the data structure includes numerous tables corresponding to the enterprise inventory, such as network devices 104. The data structure inventory storage 216 may include a series of tables each corresponding to an item of the inventory.

According to one or more embodiments, the inventory storage 216 may include a data structure that identifies all assets that may be utilized by the controller 210, along with their configurations, and other information. In one or more embodiments, the data structure may include a database, including a series of tables containing all the assets. The data structure may include such assets as network devices 104, as well other inventory and assets. Other inventory and assets may include physical entities, such as a computer or router, logical entities, such as an instance of a database, and conceptual entities, such as a service provided. Further, the data structure may include relationship information which indicates how various assets are related. For example, some services provided or software may rely on or otherwise utilize data collected by a particular network device, or two network devices may perform actions as part of a system such that the operability of one relies on the operability of another.

Although FIGS. 1 and 2 illustrate specific embodiments of a cloud computing system 100 and a multi-instance cloud architecture 200, respectively, the disclosure is not limited to the specific embodiments illustrated in FIGS. 1 and 2. For instance, although FIG. 1 illustrates that the developmental platform network 110 is implemented using data centers, other embodiments of the of the developmental platform network 110 are not limited to data centers and can utilize other types of remote network infrastructures. Moreover, other embodiments of the present disclosure may combine one or more different server instance into a single server instance. Using FIG. 2 as an example, the functionality of the meta intelligence time series server(s) 250 and the developmental platform server instance 114 may be combined into a single instance, or may be distributed across additional devices, such servers, client devices, or edge devices, or instances. The use and discussion of FIGS. 1 and 2 are only examples to facilitate ease of description and explanation.

Figure 3:
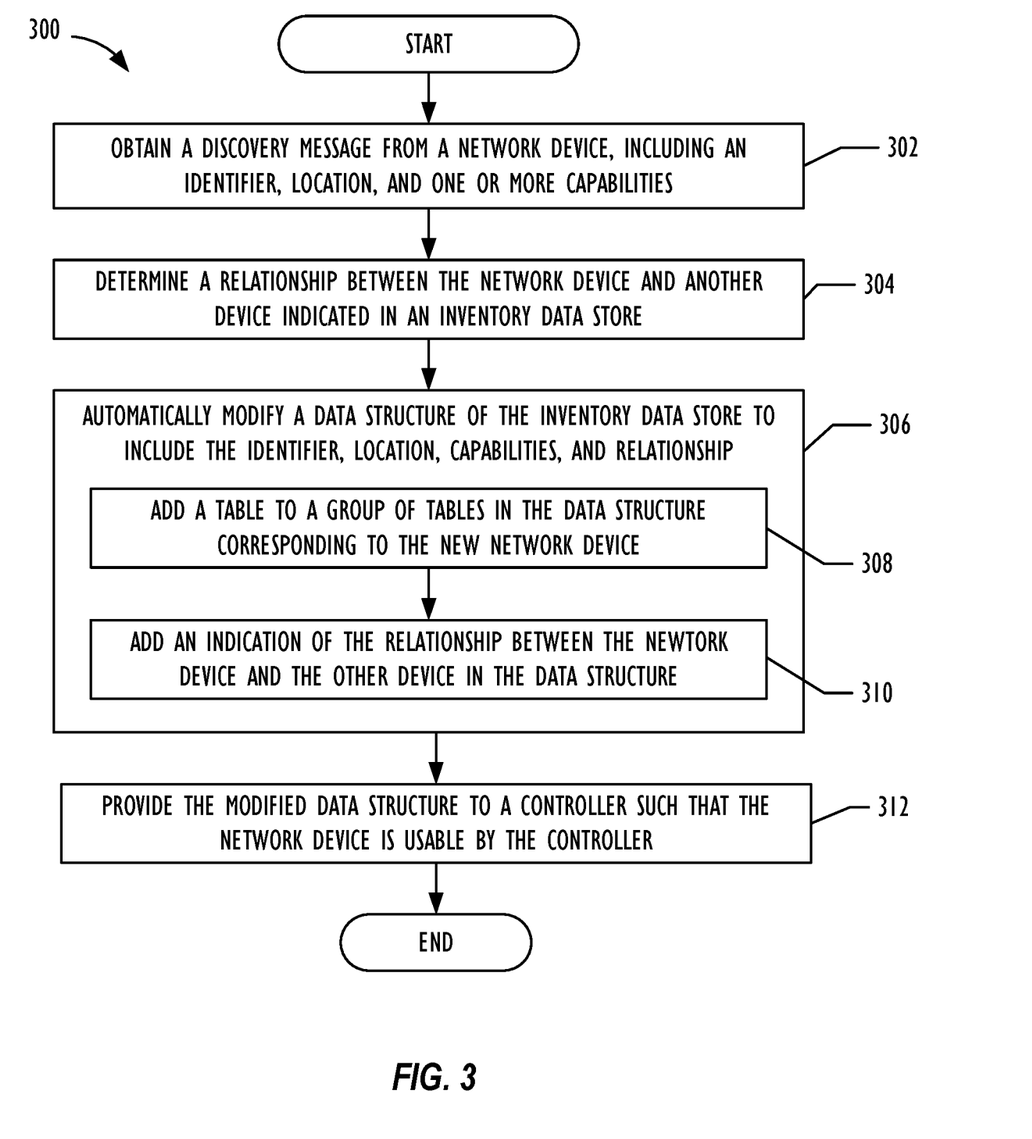
FIG. 3 is a flowchart illustrating a method for managing inventory in the form of a data structure, according to one or more embodiments.

FIG. 3 is a flowchart illustrating a method for automatically discovering and managing inventory, according to one or more embodiments. In one or more embodiments, the inventory that is automatically discovered and managed includes network devices, such as IoT devices, identified in a network. For purposes of clarity, the following description will be described with respect to the various components of FIGS. 1 and 2. However, it should be understood that the various actions may be performed by alternative components.

The flowchart 300 begins at 302, and the MID server obtains a discovery message from a network device 104. In one or more embodiments, the discovery message may be advertised by the network device 104. The discovery message may include information such as an identifier, location, and one or more capabilities of the network device. According to one or more embodiments, the discovery message may include less information, such as only identifying information. The MID server may identify an unknown device is detected, and probe the device to find out more information about the capabilities of the device and other information, as described above.

The flowchart 300 continues at 304, and a relationship between the network device and another device indicated in the interview data store is determined. For example, it may be determined that sensor data aggregated and transmitted by the newly discovered sensor device may be utilized by another previously known device in the system. As another example, the newly discovered device may be utilized for software or a service that is identified as an asset in the inventory store. In one or more embodiments, certain data generated or captured by the network device may trigger an operation that may be part of a workflow associated with a service offered.

At 306, the inventory management system automatically modifies a data structure of the inventory data store to include the determined information from the discovered network device. For example, the identifier, location information, capabilities of the device, and relationship between the newly discovered device and previously known device may be included in the data structure. According to one or more embodiments, the data structure may include a database with a set of tables. The method may include, at 308, adding a table to the group of tables in the data structure, where the new table corresponds to the new device. Then, at 310, an indication of the identified relationship between the newly discovered network device and the previously known network device may be added to the data structure. The indication may be stored in any number of ways. For example, two records in the data store may be linked to show a relationship. As another example, the relationship may be depicted in a tree structure. For example, two similar assets may be linked by a parent record identifying a common classification.

The flowchart 300 concludes at 312, and the inventory management system 208 provides the modified data structure to a controller such that the network device is usable by the controller. For example, in one or more embodiments, the controller may be able to immediately schedule workflows or other kinds of operations to be performed, at least in part, by the newly discovered network device based on the capabilities of the network device as indicated in the data structure. As another example, a controller may perform other types of tasks, such as load balancing, when a new device is added to the network. According to one or more embodiments, the addition of the asset along with its capabilities to the inventory data structure makes the asset usable to by the controller.

Figure 4:
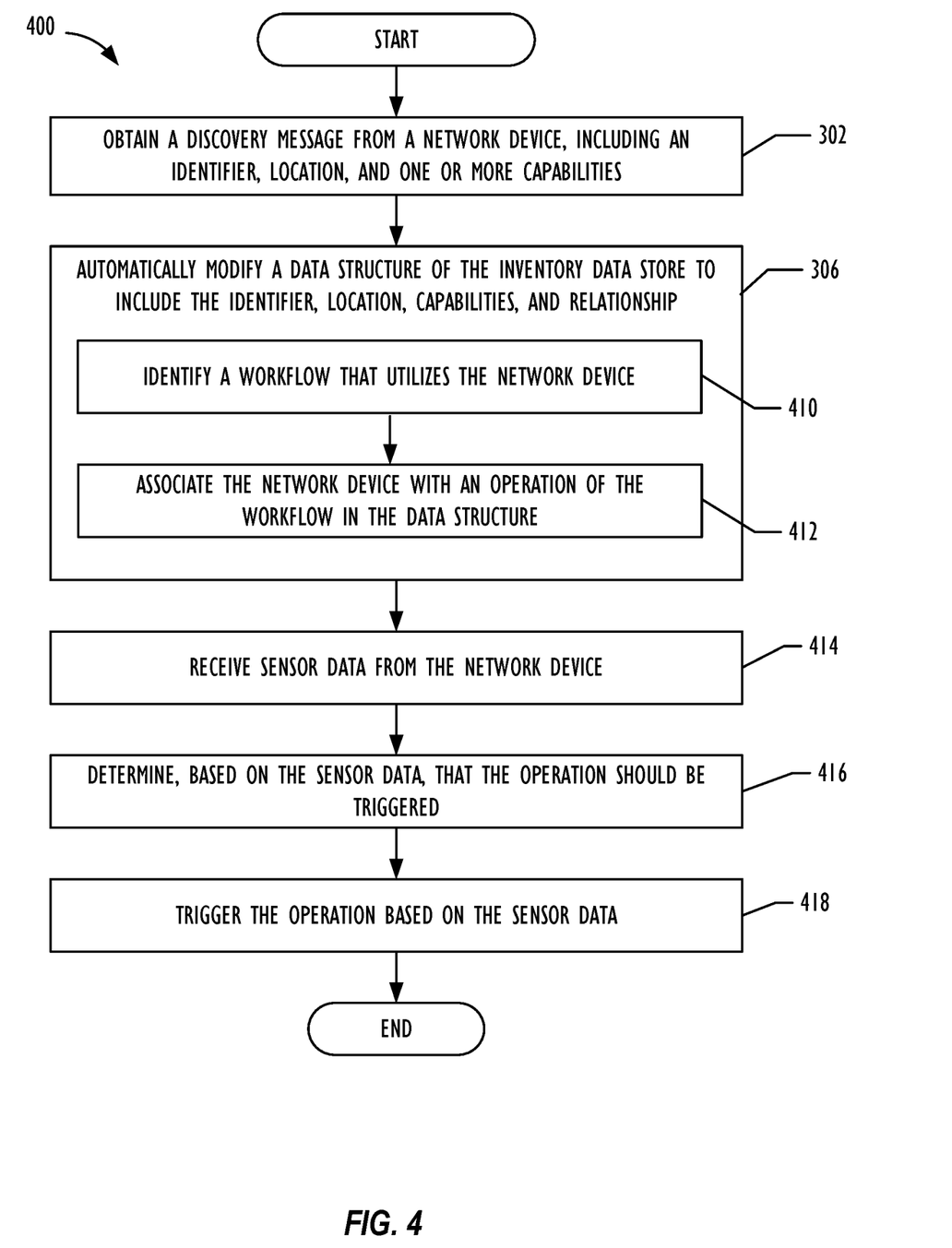
FIG. 4 depicts a flowchart illustrating a method for managing operations based on sensor data received from the inventory, according to one or more embodiments.

FIG. 4 is a flowchart 400 illustrating a method for triggering operations based on sensor data from a discovered network device, according to one or more embodiments. Flowchart 400 includes several of the same steps as depicted in flowchart 300, but indicates one or more different embodiments than those described above with respect to flowchart 300. Further, in one or more embodiments, the various steps depicted in FIG. 4 may operate in addition to those described above with respect to FIG. 3. Thus, any combination of the various actions depicted in FIG. 3 and FIG. 4 may be performed, according to one or more embodiments.

The flowchart 400 begins at 302, and the MID server obtains a discovery message from a network device, where the discovery message may include an identifier, location information, and one or more capabilities of the network device. Again, as described above, in one or more embodiments, the discovery message may not include all the data. Rather, the discovery message may include limited data, and the MID server may probe for the additional data, such as the location, capabilities, relationships, and the like. According to one or more embodiments, in flowchart 400 the discovery message obtained at 302 may be an additional discovery message. That is, discovery messages may be received by the MID server in real time as network devices are added to the network, according to one or more embodiments. Then, at 306, the inventory management system 208 automatically modifies a data structure of the inventory data store to include the discovered information about the network device, such as the identifier, the location information, and the on or more capabilities.

The flowchart 400 differs from at flowchart 300 beginning with the features described as part of the modification of the data structure at 306. At 410, a workflow is identified that utilizes the network device. In one or more embodiments, a workflow may be a series of steps or operations that should be accomplished to perform a particular task. Thus, some workflows may utilize the network device. As an example, an operation in the workflow may be triggered based on data generated or transmitted by the network device. Then, at 412, the network device is associated with an operation of the workflow in the data structure. The network device may be associated with the operation in any number of manners. For example, the workflow may be associated with a service provided, which may be an asset in the inventory store. The relationship may be stored by linking two records. The relationship may be identified in the data structure based on the type of relationship between two assets. Some examples of how two assets may be related include connected to, dependent on, used by, provided by, provided for, receives data from, runs on, and the like.

The flowchart 400 continues at 414, and sensor data is received from a network device. As described above, the network device may be any kind of device connected to other devices in the network. In one or more embodiments, the network device may include one or more sensors that capture data regarding their environment or context. As an example, a refrigerator may record and transmit temperature information, or an electronic door lock may record and transmit information about its operability.

At 416, it is determined, based on the sensor data, that the operation should be triggered. In one or more embodiments, the determination may be made, in part, on information in the data structure indicating a relationship between the workflow and the type of data. For example, a particular operation may be triggered in response to certain data being generated. In one example, a utilization rate of a network device may automate a shutdown or startup operation. For example, if a threshold utilization rate is satisfied, then operations of the network device may be shut down. Managing operations based on utilization may be applied to energy or resource management.

The flowchart 400 concludes at 418, and the operation is triggered based on the sensor data. According to one or more embodiments, the operation may be related to any number of fields. For example, the operation may be related to human resources, security, or customer service management. As an example, if sensor data for a particular device reaches a threshold, such as a temperature in a machine reaches a high temperature, an operation to disable the machine may be triggered to keep the machine from overheating. In addition, the operation may be a kind of system maintenance or performance, such as a security operation, installation of updates to firmware or software, and the like.

Figure 5:
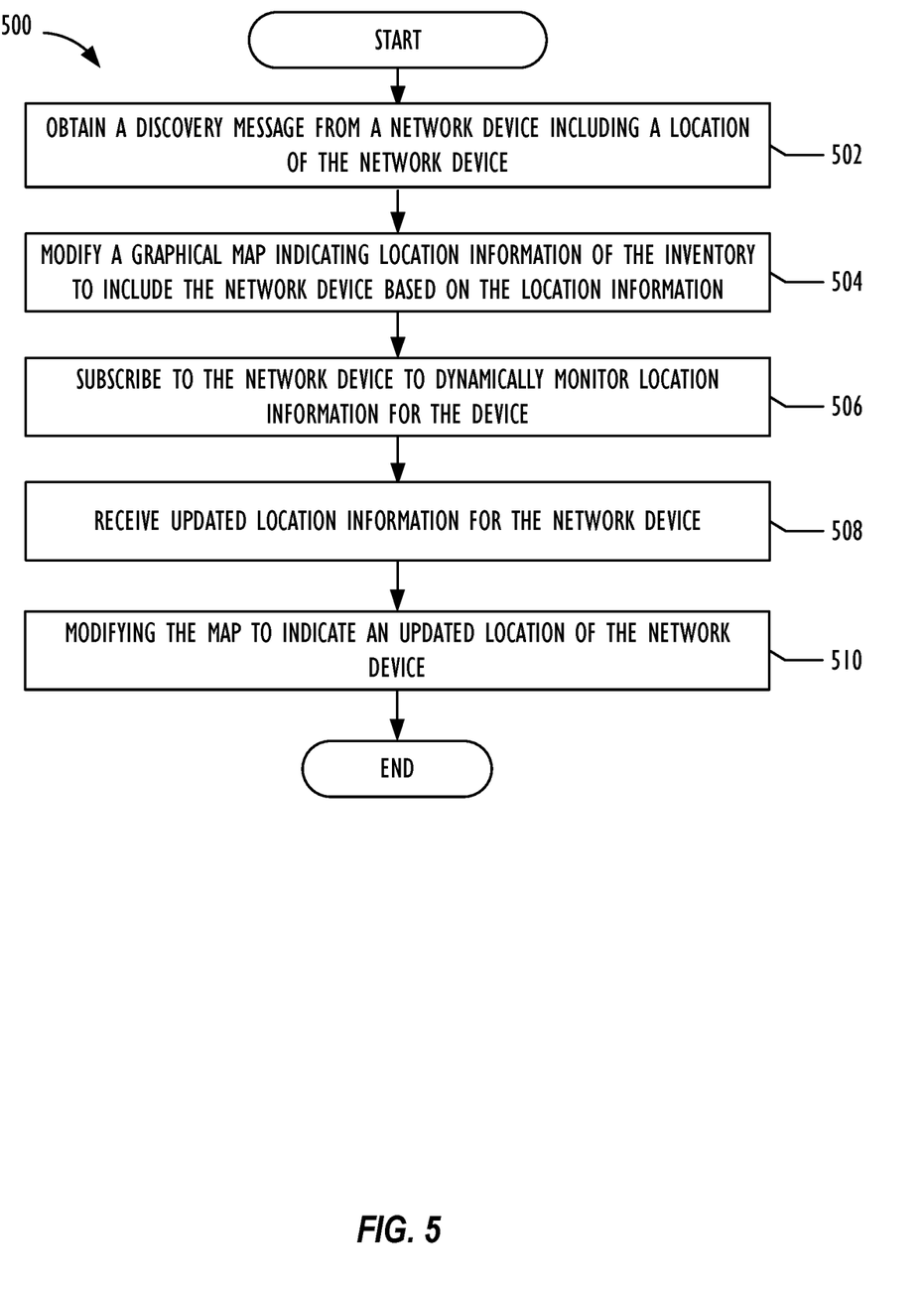
FIG. 5 depicts a flowchart illustrating a method for providing a graphical user interface for managing inventory, according to one or more embodiments.

FIG. 5 depicts a flowchart 500 illustrating a method for utilizing a map to manage network devices in an inventory, according to one or more embodiments. In one or more embodiments, the controller 210 may utilize the assets, such as network devices 104 through a graphical user interface. Because network devices may transmit updates regarding their location information, or otherwise make their updated location information available, the inventory management module may generate and update graphical representations of the inventory. The graphical representation may be, for example, a map, a chart, a graph, or any other kind of graphical representation that may illustrate relative location information of various assets such as network devices.

The flowchart begins at 502, and a discovery message is obtained from a network device including a location of the network device. Again, as described above, in one or more embodiments, the discovery message may not initially include the location data. Rather, the discovery message may include limited data, such as identifying information, and the MID server may probe for the additional data, such as the location, capabilities, relationships, and the like.

The flowchart 500 continues at 504, and a graphical map indicating location information of the inventory is modified to include the network device based on the location information. According to one or more embodiments, the graphical map may be updated to include a marker indicating the current location of an object. In one or more embodiments, the graphical map may include a floor plan of an environment in which network devices and other assets are deployed. Thus, the marker may be overlaid over a room in which the network device is located. In one or more embodiments, the marker may be overlaid with increased precision, such as a particular location or region in a room on the floor plan.

At 506, the inventory management module 214 subscribes to the network device to dynamically monitor location information for the device. In one or more embodiments, the inventory management module 214 may occasionally or periodically ping the network device to receive updated location information. Alternatively, in one or more embodiments, the inventory management module 214 may listen for messages from the network device identifying updated location information. The flowchart 500 continues at 508 and updated location information is received. The updated location information may indicate a physical location of the network device. According to one or more embodiments, the updated location information may be transmitted from the network device, or requested occasionally or periodically from the network device.

The flowchart 500 concludes at 510 and the map is modified to indicate an updated location of the network device. As described above, the updated location may indicate a different room on a floor plan, a different location or region in which the network device is located on a map, or the like. According to one or more embodiments, additional information may be depicted on the map, such as a timestamp or other indicator as to how recent the location information was updated.

According to one or more embodiments, the map may be utilized by a user, such as by the controller 210, to utilize the inventory to perform operations of workflows. In one or more embodiments, the map may be presented in a graphical user interface. The user interface may include input components that allow a user to control the network device using the user interface. According to one or more embodiments, the input component may be a graphical component by which user input may be received. The input component may additionally, or alternatively, be configured to handle other types of user input, such as audio input, gestures, and the like.

With respect to the above flowcharts, it should be understood that the various steps may be performed in an alternate manner. For example, the various steps may be performed by different components than those described with respect to FIGS. 3-5. Further, the various steps may be performed in a different order. Some steps may be performed in parallel, and some may be left out altogether, according to one or more embodiments.

Figure 6:
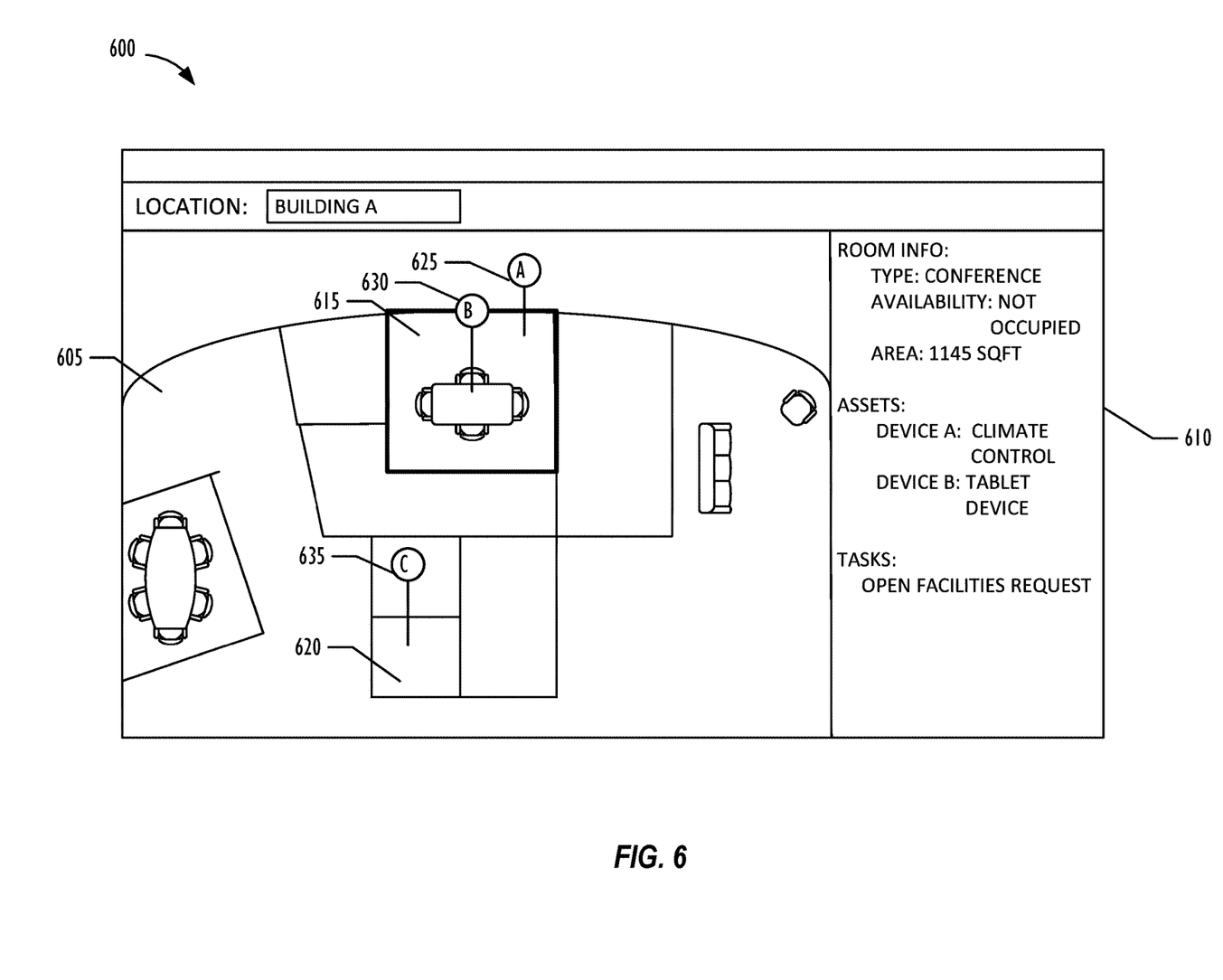
FIG. 6 illustrates an example graphical user interface for managing inventory, according to one or more embodiments.

Turning to FIG. 6, a screenshot 600 is illustrated that includes an example graphical user interface for managing inventory, according to one or more embodiments. The graphical user interface 600 may be generated by the inventory management module 214, for example. It should be understood that the example illustration of FIG. 6 is depicted merely as an example, and are not necessarily intended to limit the scope of the description. Further, the various functionality described with respect to each component may alternatively be distributed differently across the system, or may be implemented differently than shown.

As described above with respect to FIG. 5, the graphical user interface may include a floorplan or other graphical representation of an environment in which one or more network devices or other assets are located. Here, the floorplan includes an office setting 605, with several conference rooms. In this example, the environment may include an office setting in which network devices and other assets may be deployed. In this example, the location of various network devices or other assets are identified by Pin A 625, Pin B 630, and Pin C 635. As depicted, Pin A 625 and Pin B 630 may be located in conference room 615, while Pin C 635 is located in conference room 620.

According to one or more embodiments, the graphical user interface may provide functionality such that a user may control or manage the various network devices through the user interface 600. In one or more embodiments, by selecting a particular room, area, device, or other object or area, more information may be shown. In the example screen shot 600, the user may have selected conference room 615. More information may be provided, for example, within column 610 in the user interface. Column 610 provides information such as the type of room (identifying that room 615 is a conference room), an availability of the room, and other characteristics of the room, such as the square footage.

In one or more embodiments, the column 610 may provide identifying or other information about the assets in that room. In this example, the column 610 identifies network device A 625 as a climate control device, and network device B 630 as a tablet device. For example, climate control device 625 may be a smart thermostat or the like. Device B 630 may be some kind of tablet device either left in conference room 615, or assigned to and currently located in conference room 615. Thus, if tablet device 630 was accidentally left in conference room 615, an administrator or other user utilizing the user interface may quickly locate the device.

According to one or more embodiments, the user interface may also allow a user to quickly assign tasks to certain network devices or other assets. As depicted, with respect to the selected conference room 615, an open facilities request may be initiated. This may include managing climate control so that the room is heated or cooled prior to a scheduled use by device A 625, for example. In one or more embodiments, the open facilities request may be an operation or a workflow associated with device A 625, for example, in inventory storage 216.

Figure 7:
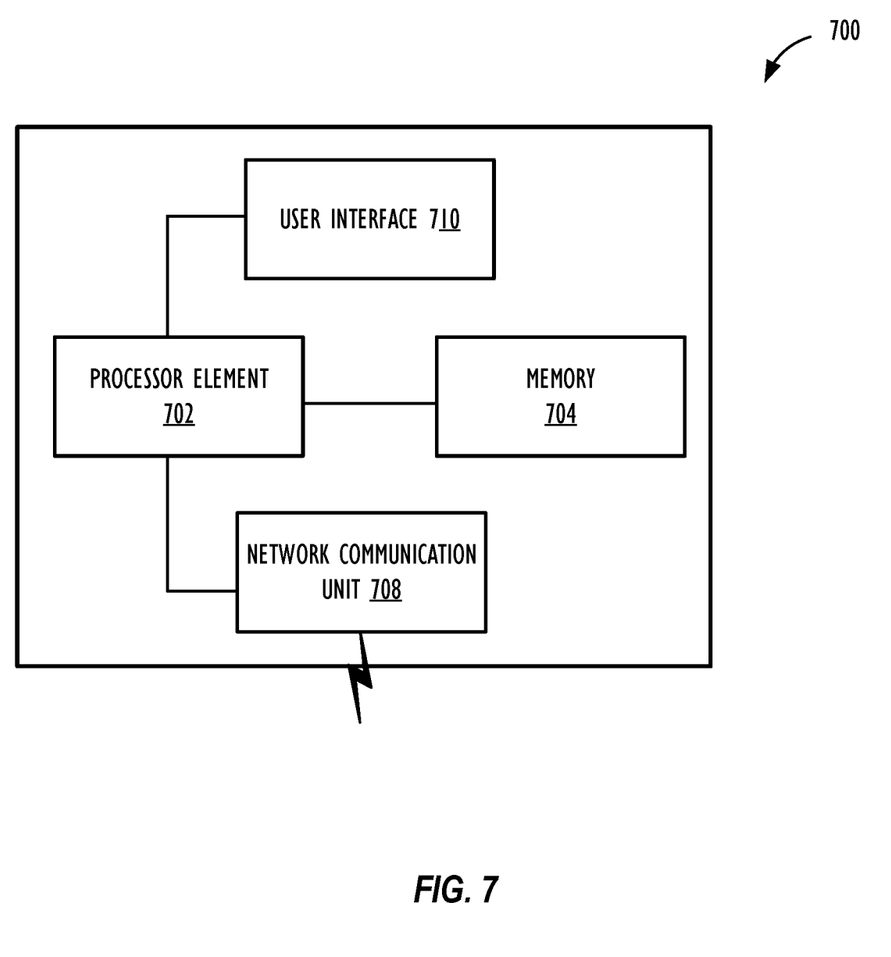
FIG. 7 is a block diagram illustrating another embodiment of computing system for use with techniques described herein.

Referring now to FIG. 7, a block diagram illustrates a computing device 700 that may be used for implementing the techniques described herein in accordance with one or more embodiments. For example, the computing device 700 illustrated in FIG. 7 could represent a client device or a physical server device. As shown in FIG. 7, the computing device 700 can include one or more input/output devices, such as a network communication unit 708 that could include a wired communication component and/or a wireless communications component, which can be coupled to processing element 702. The network communication unit 708 can utilized any of a variety of standardized network protocols, such as Ethernet, TCP/IP, to name a few of many protocols, to effect communications between devices and comprise one or more transceiver(s) that utilize the Ethernet, power line communication (PLC), WiFi, and/or other communication methods.

The computing system 700 includes a processing element 702 that contains one or more hardware processors, where each hardware processor may have a single or multiple processor cores. In one embodiment, the processing element 702 may include at least one shared cache that store data (e.g., computing instructions) that are utilized by one or more other components of processing element 702. For example, the shared cache may be locally cache data stored in a memory for faster access by components of the processing elements 702. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 7, the processing element 702 may also include one or more other types of hardware processing components, such as graphics processing units (GPU), application specific integrated circuits (ASICs), field-programmable gate arrays (FPGAs), and/or digital signal processors (DSPs).

FIG. 7 illustrates that memory 704 may be operatively coupled to processing element 702. Memory 704 may be a non-transitory medium configured to store various types of data. For example, memory 704 may include one or more memory devices that comprise a non-volatile storage device and/or volatile memory. Volatile memory, such as random access memory (RAM), can be any suitable non-permanent storage device. The non-volatile storage devices can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage device may be used to store overflow data if allocated RAM is not large enough to hold all working data. The non-volatile storage device may also be used to store programs that are loaded into the RAM when such programs are selected for execution.

Persons of ordinary skill in the art are aware that software programs may be developed, encoded, and compiled in a variety computing languages for a variety software platforms and/or operating systems and subsequently loaded and executed by processing element 702. In one embodiment, the compiling process of the software program may transform program code written in a programming language to another computer language such that the processing element 702 is able to execute the programming code. For example, the compiling process of the software program may generate an executable program that provides encoded instructions (e.g., machine code instructions) for processor 702 to accomplish specific, non-generic, particular computing functions.

After the compiling process, the encoded instructions may then be loaded as computer executable instructions or process steps to processing element 702 from storage (e.g., memory 704) and/or embedded within the processing element 702 (e.g., cache). Processing element 702 can execute the stored instructions or process steps in order to perform instructions or process steps to transform the computing device into a non-generic, particular, specially programmed machine or apparatus. Stored data, e.g., data stored by a storage device, can be accessed by processing element 702 during the execution of computer executable instructions or process steps to instruct one or more components within the computing device 700.

A user interface 710 can include a display, positional input device (such as a mouse, touchpad, touchscreen, or the like), keyboard, or other forms of user input and output devices. The user interface 710 can be coupled to processor element 702. Other output devices that permit a user to program or otherwise use the computing device can be provided in addition to or as an alternative to network communication unit 708. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 700 may comprise other components well known in the art, such as sensors, powers sources, and/or analog-to-digital converters, not explicitly shown in FIG. 7. For ease of discussion, FIG. 7 explanation of these other components well known in the art.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application

What is claimed is:

1. A method, comprising:
   receiving, via a computing device, a message from an Internet-of-Things (IOT) device;
   identifying, via the computing device, an identifier of the IOT device, a location of the IOT device, or one or more capabilities of the IOT device based on the message;
   generating, via the computing device, a data structure to include the identifier of the IOT device, the location of the IOT device, and the one or more capabilities of the IOT device, wherein the data structure is configured to identify enterprise assets, including the IOT device, and configurations of the enterprise assets; and
   providing, via the computing device, access to the data structure to a controller such that the IOT device is usable by the controller.

2. The method of claim 1, wherein the data structure comprises a plurality of tables comprising the enterprise assets and corresponding configurations of the enterprise assets, and wherein generating the data structure comprises adding a new table corresponding to the IOT device to the plurality of tables.

3. The method of claim 2, comprising identifying, via the computing device, a relationship between the IOT device and an additional device indicated in the data structure based on the one or more capabilities of the IOT device, wherein generating the data structure comprises indicating, via the computing device, the relationship between the IOT device and the additional device.

4. The method of claim 1, comprising:
   receiving, via the computing device, location information for the TOT device within the message generated by the TOT device for broadcast from the TOT device; and
   updating, via the computing device, the data structure to reflect an updated location of the TOT device.

5. The method of claim 4, comprising:
   obtaining, via the computing device, a graphical user interface comprising a map depicting location information for the enterprise assets;
   modifying, via the computing device, the graphical user interface based on the updated location of the TOT device; and
   displaying, via the computing device, the modified graphical user interface.

6. The method of claim 5, wherein the map comprises a visualization of an office setting, a visualization of an enterprise setting, a visualization of one or more conference rooms, or any combination thereof.

7. The method of claim 1, comprising:
   receiving, via the computing device, sensor data advertised from the TOT device;
   determining, via the computing device, that an operation should be triggered based at least in part on the sensor data; and triggering, via the computing device, the operation in response to determining, via the computing device, to trigger the operation.

8. A non-transitory computer-readable medium comprising computer-readable code executable by one or more processors, that when executed by the one or more processors, causes a computing device to perform operations comprising:
receiving a broadcast message from an Internet-enabled device;
identifying information associated with the Internet-enabled device in response to receiving the broadcast message;
modifying an inventory data store to include an identifier of the Internet-enabled device, a location of the Internet-enabled device, or one or more capabilities of the Internet-enabled device, wherein the inventory data store identifies enterprise assets and configurations of the enterprise assets; and
providing access to the modified inventory data store to a controller such that the Internet-enabled device is usable by the controller.

9. The non-transitory computer-readable medium of claim 8, wherein the inventory data store comprises a plurality of tables comprising the enterprise assets and corresponding configurations of the enterprise assets, and wherein the operations to modify the inventory data store comprise adding a new table corresponding to the Internet-enabled device to the plurality of tables.

10. The non-transitory computer-readable medium of claim 9, the operations comprising:
identifying a relationship between the Internet-enabled device and an additional device indicated in the inventory data store based on the one or more capabilities of the Internet-enabled device, wherein modifying the inventory data store comprises indicating the relationship between the Internet-enabled device and the additional device.

11. The non-transitory computer-readable medium of claim 8, wherein the information comprises an identifier of the Internet-enabled device, a location of the Internet-enabled device, and one or more capabilities of the Internet-enabled device.

12. The non-transitory computer-readable medium of claim 11, the operations comprising:
obtaining a graphical user interface comprising a map depicting location information for the enterprise assets;
modifying the graphical user interface based on updated location information for the Internet-enabled device; and
displaying the modified graphical user interface.

13. The non-transitory computer-readable medium of claim 8, the operations comprising:
receiving sensor data from the Internet-enabled device;
determining that an operation should be triggered based at least in part on the sensor data; and
performing the operation in response to determining to trigger the operation.

14. The non-transitory computer-readable medium of claim 13, the operations comprising:
identifying a threshold value corresponding to the operation; and
performing the operation in response to determining that the sensor data exceeds the threshold value.

15. A system for improving automated identification of inventory, comprising:
one or more processors; and
one or more memory devices coupled to the one or more processors and comprising computer-readable code executable by the one or more processors that, when executed by the one or more processors, causes the system to perform operations comprising:
receiving a message comprising an identifier of an Internet-enabled device from the Internet-enabled device;
identifying additional data comprising a location of the Internet-enabled device or one or more capabilities of the Internet-enabled device at least in part by probing the Internet-enabled device for the additional data in response to receiving the message;
generating a data structure that includes the identifier of the Internet-enabled device, the location of the Internet-enabled device, or the one or more capabilities of the Internet-enabled device based on the message; and
providing access to the data structure to a controller such that the Internet-enabled device is usable by the controller.

16. The system of claim 15, the operations comprising modifying the data structure of an inventory data store, wherein the inventory data store comprises a plurality of tables comprising indications of configurations of enterprise assets.

17. The system of claim 15, the operations comprising:
receiving updated location information for the Internet-enabled device; and
updating the data structure to reflect an updated location of the Internet-enabled device.

18. The system of claim 17, the operations comprising:
obtaining a graphical user interface comprising a map depicting location information for enterprise assets;
modifying the graphical user interface based on the updated location information for the Internet-enabled device; and
displaying the modified graphical user interface.

19. The system of claim 15, the operations comprising:
receiving sensor data from the Internet-enabled device;
determining that an operation should be triggered based on the sensor data; and
triggering the operation in response to determining to trigger the operation.

20. The system of claim 19, the operations comprising:
identifying a threshold value corresponding to the operation; and
triggering the operation in response to determining that the sensor data exceeds the threshold value.

* * * * *

UNITED STATES PATENT AND TRADEMARK OFFICE
CERTIFICATE OF CORRECTION

PATENT NO.        : 11,050,632 B2
APPLICATION NO.   : 16/581082
DATED             : June 29, 2021
INVENTOR(S)       : William Jason Smith and Gianpaolo Pagano Mariano Page 1 of 1

It is certified that error appears in the above-identified patent and that said Letters Patent is hereby corrected as shown below:

In the Claims

Column 14, Line 45, Claim 4, please replace "TOT" with --IOT--;
    Line 46, Claim 4, please replace both instances of "TOT" with --IOT--; and
    Line 48, Claim 4, please replace "TOT" with --IOT--.

Column 14, Line 54, Claim 5, please replace "TOT" with --IOT--.

Column 14, Line 64, Claim 7, please replace "TOT" with --IOT--.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*